(12) United States Patent
Morales

(10) Patent No.: US 11,267,367 B1
(45) Date of Patent: Mar. 8, 2022

(54) THIRD RAIL INSULATOR

(71) Applicant: Miguel Angel Morales, Hialeah, FL (US)

(72) Inventor: Miguel Angel Morales, Hialeah, FL (US)

( * ) Notice: Subject to any disclaimer, the term of this patent is extended or adjusted under 35 U.S.C. 154(b) by 274 days.

(21) Appl. No.: 16/679,681

(22) Filed: Nov. 11, 2019

(51) Int. Cl.
*B60M 1/30* (2006.01)
*B60M 1/04* (2006.01)

(52) U.S. Cl.
CPC .............. *B60M 1/307* (2013.01); *B60M 1/04* (2013.01)

(58) Field of Classification Search
CPC .......... B60M 1/307; B60M 1/04; B60M 1/24; B60M 1/18; B60M 1/16; H01B 17/18; H01B 17/02; H01B 17/56
See application file for complete search history.

(56) References Cited

U.S. PATENT DOCUMENTS

| | | | | |
|---|---|---|---|---|
| 320,632 | A * | 6/1885 | Daft | B60M 1/307 191/32 |
| 1,731,796 | A * | 10/1929 | Schmid | B60M 1/307 105/60 |
| 7,926,634 | B1 | 4/2011 | Morales | |
| 2015/0322971 | A1 * | 11/2015 | Kloft | F15B 1/24 92/134 |

FOREIGN PATENT DOCUMENTS

| | | | | |
|---|---|---|---|---|
| CN | 2234032 Y | * | 8/1996 | |
| GB | 2412018 A | * | 9/2005 | ............ H01B 17/18 |
| JP | H01132998 U | * | 9/1989 | |

* cited by examiner

*Primary Examiner* — Mark T Le
(74) *Attorney, Agent, or Firm* — Albert Bordas, P.A.

(57) ABSTRACT

A third rail insulator having a head assembly with a channel, and a pedestal assembly. The head assembly and the pedestal assembly are integrated as a single structure to support and isolate a contact rail assembly that supplies power to a transit vehicle. The channel is an open channel that diametrically extends along the upper section of the head assembly. The channel receives the contact rail assembly.

13 Claims, 3 Drawing Sheets

THIRD RAIL INSULATOR

BACKGROUND OF THE INVENTION

1. Field of the Invention

The present invention relates to insulating systems, and more particularly, to third rail power insulating systems.

2. Description of the Related Art

Applicant believes that one of the closest references corresponds to U.S. Pat. No. 7,926,634 B1 issued to Applicant's own Miguel Angel Morales on Apr. 19, 2011 for Third rail power insulating system. However, it differs from the present invention because Morales teaches a third rail power insulating system comprising an insulator assembly and a cover board assembly. The insulator assembly comprises pedestal supporting insulators that are mounted onto a contact rail assembly. The insulator assembly further comprises an insulator anchor bolt assembly, a base shim plate, a bolt assembly, a lubricating shim, and retaining clips. The cover board assembly is also mounted onto the contact rail assembly and it comprises a support bracket assembly, retaining clips, a side cover board, and a top cover board. The support bracket assembly has a general C-shape and comprises a lateral wall, a top wall, a base wall, and a protrusion. The side cover board comprises an elongated plate having at least one hole, and the top cover board comprises an elongated plate having sufficient curvature to contour the support bracket assembly.

Other patents describing the closest subject matter provide for a number of more or less complicated features that fail to solve the problem in an efficient and economical way. None of these patents suggest the novel features of the present invention.

SUMMARY OF THE INVENTION

The present invention is a third rail insulator comprising a head assembly having a channel and a pedestal assembly. The head assembly and the pedestal assembly are integrated as a single structure to support and isolate a contact rail assembly that supplies power to a transit vehicle.

The head assembly comprises a head top, a channel base, and a head lateral wall. The channel is an open channel that diametrically extends along the upper section of the head assembly. The head assembly is hollow and further comprises a lateral interior face and a head interior base having a plurality of radial walls. The head interior base defines first and second head interior cavities. The head assembly further comprises a head perimeter edge having a first predetermined diameter.

The pedestal assembly comprises a base and a body having a top end. The body extends from the head interior base. The top end is circular in shape and comprises a second predetermined diameter. The base comprises a bottom perimeter edge having a third predetermined diameter. The pedestal assembly further comprises an internal cylindrical structure that concentrically extends inside the pedestal assembly. The internal cylindrical structure defines an inner cavity. The internal cylindrical structure comprises a cylindrical structure perimeter edge having a fourth predetermined diameter. The bottom perimeter edge and the cylindrical structure perimeter edge align on a same plane.

A central cylindrical structure concentrically extends from the head interior base inside the internal cylindrical structure. The radial walls extend from the lateral interior face to the body. A first set of base radial walls extends from an interior face of the body to the internal cylindrical structure defining pedestal cavities, and a second set of the base radial walls extend from an interior face of the internal cylindrical structure to the central cylindrical structure.

The first predetermined diameter is larger than the third predetermined diameter, the fourth diameter is smaller than the third predetermined diameter, and the second predetermined diameter is smaller than the third predetermined diameter. The channel receives the contact rail assembly.

It is therefore one of the main objects of the present invention to provide a third rail insulator.

It is another object of this invention to provide a third rail insulator made of a highly resistant material.

It is another object of this invention to provide a third rail insulator, which is of a durable and reliable construction.

It is yet another object of this invention to provide a third rail insulator that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
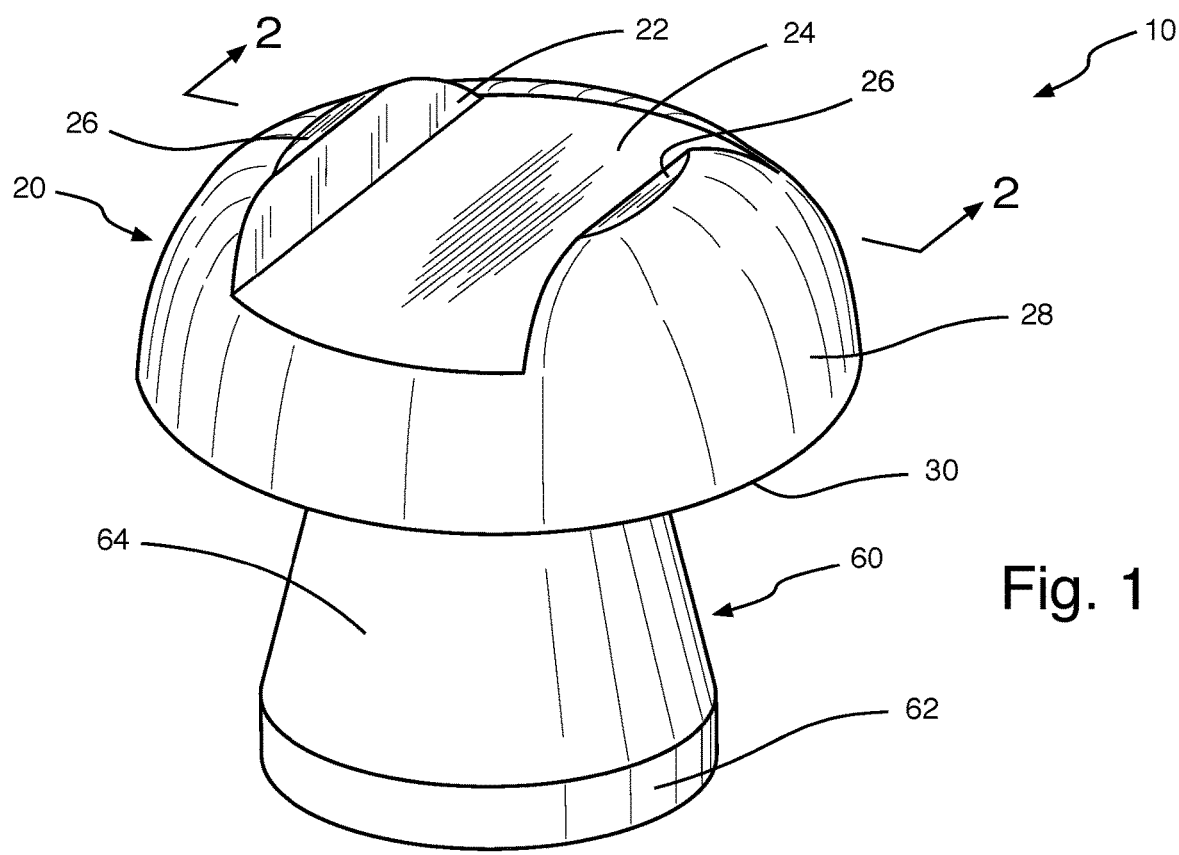
FIG. 1 is an isometric view of the present invention.

Referring now to the drawings, the present invention is a third rail insulator, and is generally referred to with numeral 10. It can be observed that it basically includes head assembly 20 and pedestal assembly 60.

As seen in FIG. 1, head assembly 20 and pedestal assembly 60 are integrated as a single structure. Head assembly 20 comprises channel 22. Channel 22 is an open channel that diametrically extends along an upper section of head assembly 20. Channel 22 comprises channel base 24.

Head assembly 20 further comprises head top 26, and head lateral wall 28 defining head perimeter edge 30.

Pedestal assembly 60 comprises base 62 and body 64. Base 62 extends from body 64.

Present invention 10 is manufactured from a natural-colored glass fiber and mineral filled polyphenylene sulfide compound that provides enhanced mechanical strength with good electrical properties and outstanding chemical resistance, even at elevated temperatures. The compound comprises the following properties:

Physical

Specific Gravity: approximately 1.94, (ASTM D792)

Molding Shrinkage—Flow (3.20 mm): approximately 0.20%, (No Standard)

Molding Shrinkage—Across Flow (3.20 mm): approximately 0.40%, (No Standard)
Water Absorption (23° C., 24 hr): approximately 0.020%, (ASTM D570)
Mechanical
Tensile Strength: approximately 159 MPa, (ASTM D638)
Tensile Stress: approximately 165 MPa, (ISO 527-2)
Tensile Elongation (Break): approximately 1.1%, (ASTM D638)
Tensile Strain (Break): approximately 1.1%, (ISO 527-2)
Flexural Modulus: approximately 19300 MPa, (ASTM D790)
Flexural Modulus: approximately 19000 MPa, (ISO 178)
Flexural Strength: approximately 241 MPa, (ASTM D790)
Flexural Stress: approximately 255 MPa, (ISO 178)
Compressive Strength: approximately 295 MPa, (ASTM D695)
Poisson's Ratio: approximately 0.34, (ISO 527)
Impact
Notched Izod Impact (3.18 mm): approximately 75 J/m, (ASTM D256)
Notched Izod Impact Strength: approximately 8.0 kJ/m$^2$, (ISO 180/A)
Unnotched Izod Impact (3.18 mm): approximately 320 J/m, (ASTM D4812)
Unnotched Izod Impact Strength: approximately 24 kJ/m$^2$, (ISO 180)
Hardness
Rockwell Hardness (ASTM D785)
M-Scale: approximately 101
R-Scale: approximately 119
Thermal
Deflection Temperature Under Load, (ASTM D648)
1.8 MPa, Unannealed: approximately 265° C.
CLTE—Flow (ASTM E831)
 −50 to 50° C.: approximately 1.5E-5 cm/cm/° C.
 100 to 200° C.: approximately 1.0E-5 cm/cm/° C.
CLTE—Transverse, (ASTM E831)
 −50 to 50° C.: approximately 3.0E-5 cm/cm/° C.
 100 to 200° C.: approximately 7.0E-5 cm/cm/° C.
Thermal Conductivity: approximately 0.51 W/m/K, (No Standard)
UL Temperature Rating: approximately 220 to 240° C., (UL 746B)
Electrical
Surface Resistivity: approximately 1.0E+16 ohms, (ASTM D257)
Volume Resistivity: approximately 1.0E+15 ohms-cm, (ASTM D257)
Dielectric Strength: approximately 18 kV/mm, (ASTM D149)
Dielectric Constant, (ASTM D150)
 25° C., 1 kHz: approximately 4.70
 25° C., 1 MHz: approximately 4.60
Dissipation Factor, (ASTM D150)
 25° C., 1 kHz: approximately 2.0E-3
 25° C., 1 MHz: approximately 3.0E-3
Arc Resistance: approximately 180 sec, (ASTM D495)
Comparative Tracking Index (CTI): approximately 225 V, (UL 746)
Insulation Resistance2 (90° C.): approximately 1.0E+10 ohms, (No Standard)
Flammability
Flame Rating (1.60 mm): approximately V-0 5VA, (UL 94)
Oxygen Index: approximately 65%, (ASTM D2863)

Figure 2:
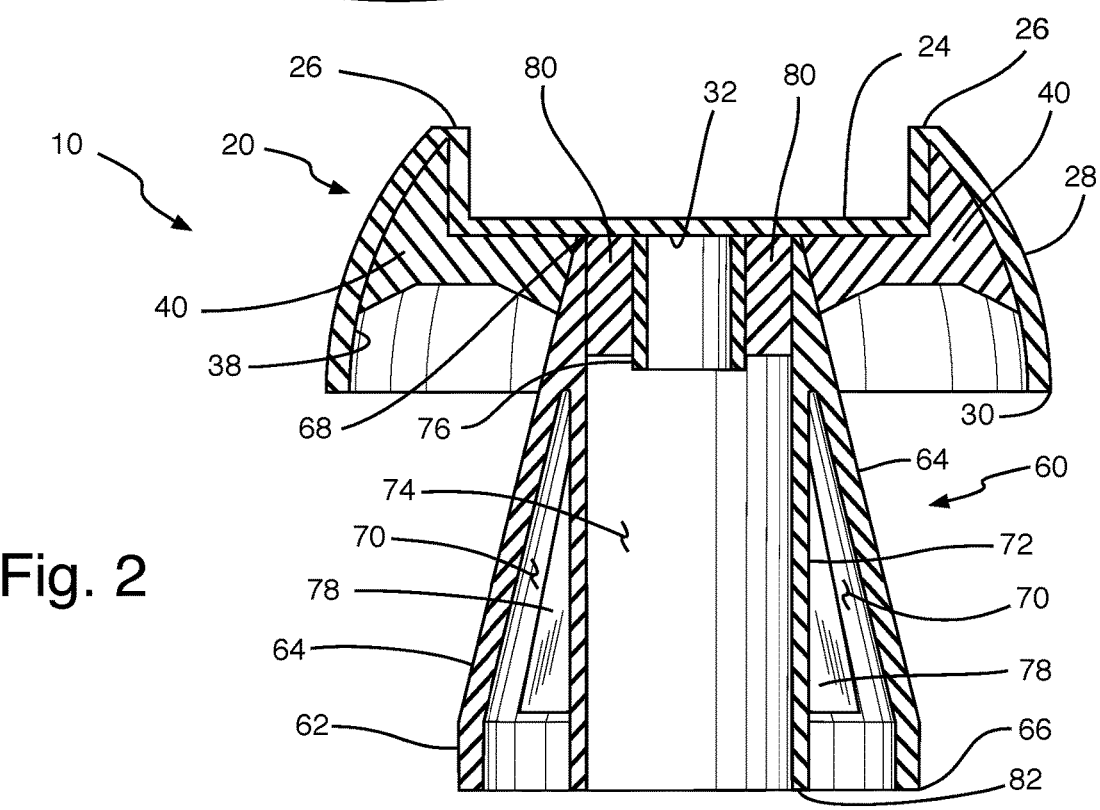
FIG. 2 is a cut view taken along lines 2-2 as shown in FIG. 1.

As seen in FIG. 2, head assembly 20 further comprises head interior base 32 and lateral interior face 38 having a plurality of radial walls 40. Radial walls 40 extend from lateral interior face 38 to body 64.

Body 64 extends from head interior base 32. Body 64 comprises top end 68. Top end 68 is circular in shape.

Pedestal assembly 60 further comprises internal cylindrical structure 72 that concentrically extends inside of pedestal assembly 60. Internal cylindrical structure 72 defines inner cavity 74. Central cylindrical structure 76 extends from head interior base 32 concentrically inside internal cylindrical structure 72.

A first set of base radial walls 78 extends from an interior face of body 64 to internal cylindrical structure 72, without reaching base 62, and defining pedestal cavities 70. A second set of base radial walls 80 extend from an interior face of internal cylindrical structure 72 to central cylindrical structure 76.

Figure 3:
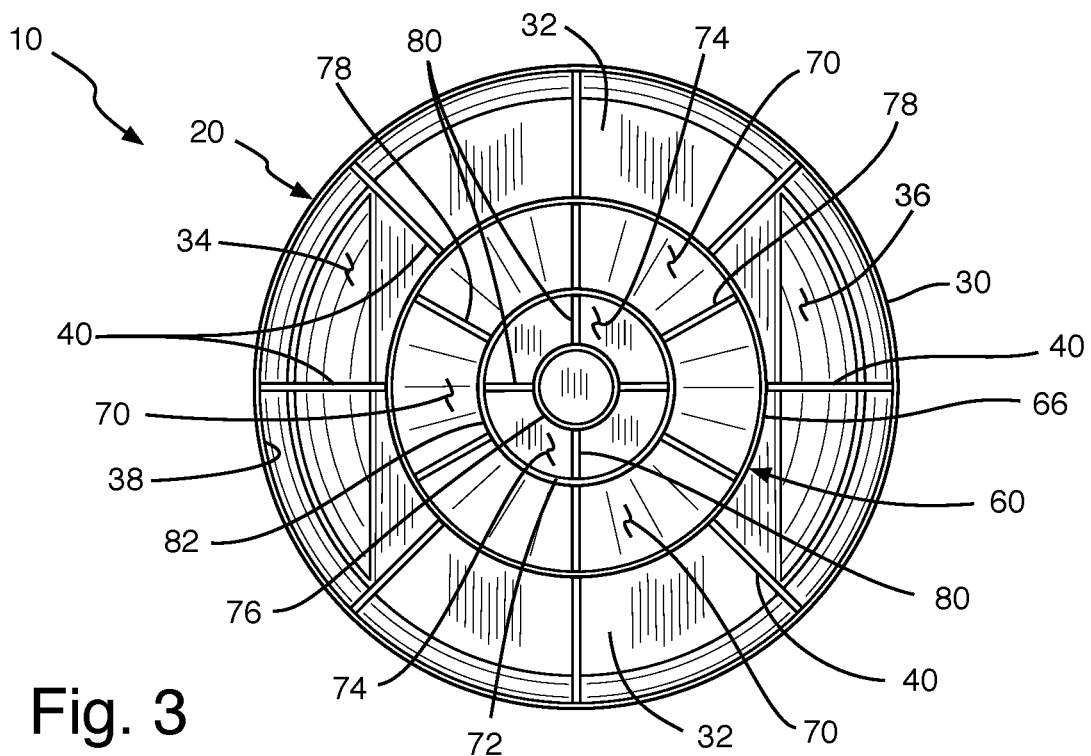
FIG. 3 is a bottom view of the present invention.
Figure 4:
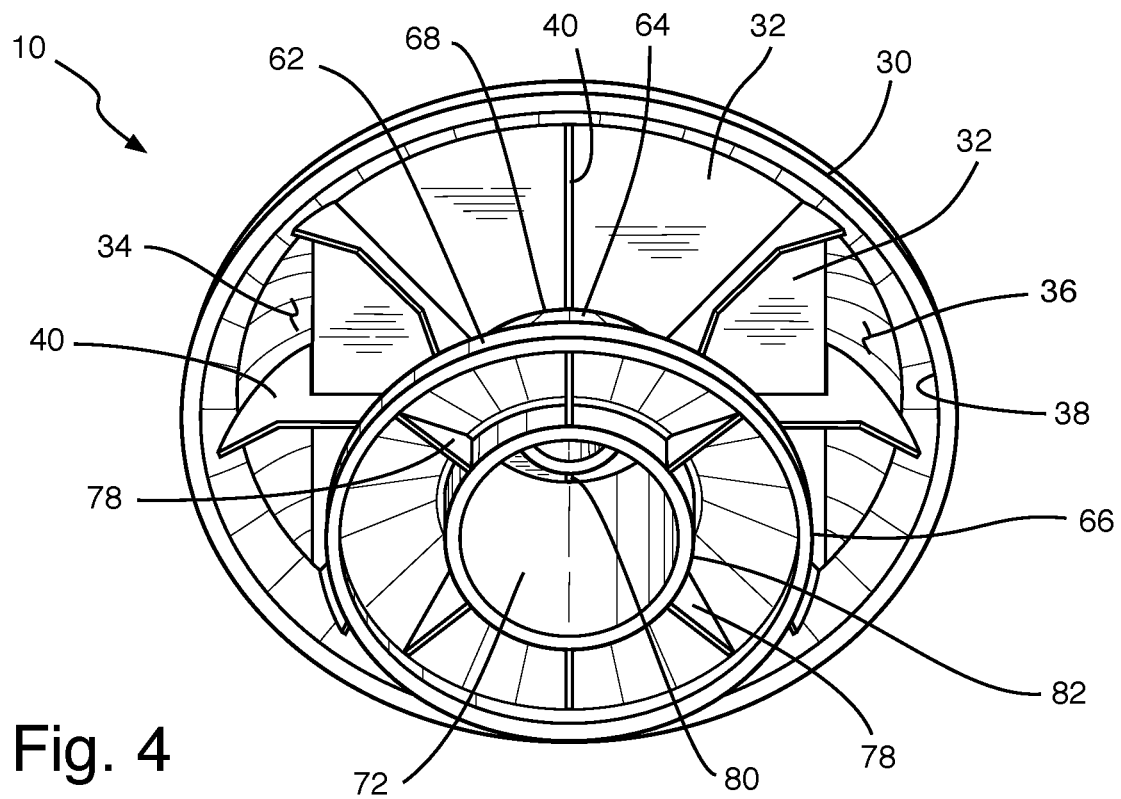
FIG. 4 is a bottom isometric view of the present invention.

As seen in FIGS. 3 and 4, head assembly 20 is hollow and head interior base 32 defines first and second head interior cavities 34 and 36. Internal cylindrical structure 72 comprises cylindrical structure perimeter edge 82. Bottom perimeter edge 66 and cylindrical structure perimeter edge 82 align on a same plane. Head perimeter edge 30 comprises a first predetermined diameter and top end 68 comprises a second predetermined diameter. Base 62 comprises bottom perimeter edge 66 having a third predetermined diameter, and cylindrical structure perimeter edge 82 comprises a fourth predetermined diameter.

The first predetermined diameter of head perimeter edge 30 is larger than the third predetermined diameter of bottom perimeter edge 66, and the fourth diameter of cylindrical structure perimeter edge 82 is smaller than the third predetermined diameter. In addition, second predetermined diameter of top end 68 is smaller than the third predetermined diameter of bottom perimeter edge 66.

Figure 5:
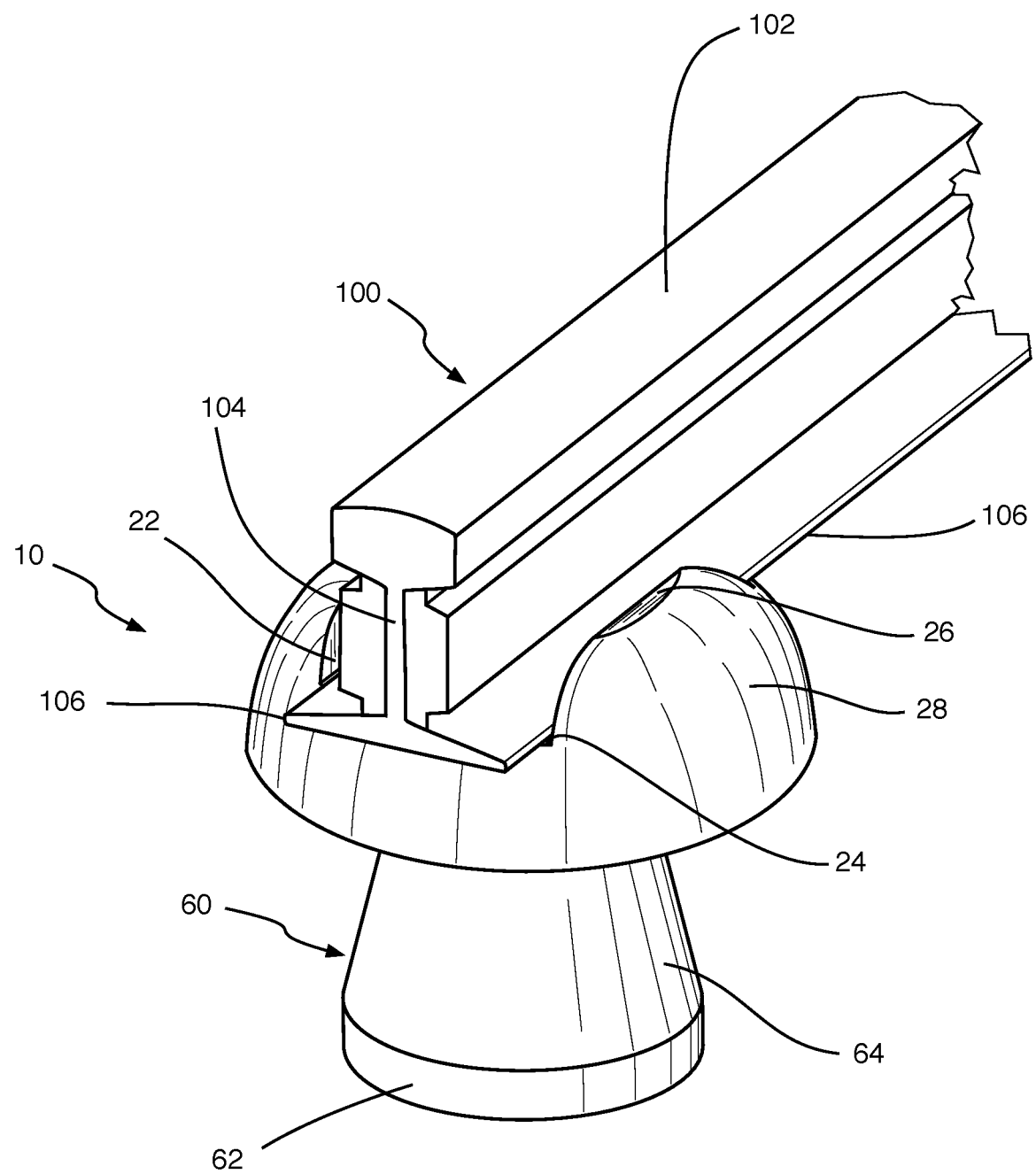
FIG. 5 is an isometric view of the present invention having a contact rail mounted thereon.

As seen in FIG. 5, present invention 10 supports and isolates contact rail assembly 100, which supplies power to a transit vehicle. In a preferred embodiment, the transit vehicle is a railcar. Contact rail assembly 100 comprises head 102 extending from neck 104 and having base 106. Contact rail assembly 100 is mounted onto present invention 10. Channel 22 receives contact rail assembly 100, whereby base 106 rests onto channel base 24.

Although not illustrated, contact rail assembly 100 is part of a contact rail system, which supplies positive power source to transit vehicles. The contact rail system is an arrangement of components consisting of contact rail, splice bars and pin bolts, anchor assemblies, expansion joints, end approaches, dip rail sections, and fastening hardware. Contact rail assembly 100 is a trackside conductor consisting of steel rail with aluminum bars attached on webs that are used to transmit electrical energy from a power source to a transit vehicle via current-collector shoes. Current collector shoes are part of a current collector attached to a vehicle, which rides along the top of the contact rail. Head 102 comprises a dip rail section, not seen, defining a portion of the contact rail at an elevation below the standard elevation, which allows the current-collector shoe in its lowest position to pass over it without physical contact.

Contact rail assembly 100 also comprises an end approach section, not seen, which is a section of contact rail used at the ends to ramp the collector shoe from one elevation in full contact, to another elevation out of contact, with the contact rail, or vice versa. Furthermore, contact rail assembly 100 also comprises expansion joints, not seen, which are an assembly used in the contact rail to accommodate thermal expansion and contractions.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A third rail insulator, comprising:
   A) a head assembly having a channel, a lateral interior face and a head interior base having a plurality of radial walls, said head assembly further comprises a head perimeter edge having a first predetermined diameter; and
   B) a pedestal assembly, wherein said head assembly and said pedestal assembly are integrated as a single structure to support and isolate a contact rail assembly that supplies power to a transit vehicle, said pedestal assembly comprising a base and a body having a top end, said top end is circular in shape and comprises a second predetermined diameter, said base comprises a bottom perimeter edge having a third predetermined diameter, said pedestal assembly further comprising an internal cylindrical structure that concentrically extends inside of said pedestal assembly, said internal cylindrical structure defines an inner cavity, a central cylindrical structure concentrically extends from said head interior base inside said internal cylindrical structure.

2. The third rail insulator set forth in claim 1, further characterized in that said head assembly comprises a head top, a channel base, and a head lateral wall.

3. The third rail insulator set forth in claim 1, further characterized in that said channel is an open channel that diametrically extends along an upper section of said head assembly.

4. The third rail insulator set forth in claim 1, further characterized in that said head assembly is hollow.

5. The third rail insulator set forth in claim 1, further characterized in that said head interior base defines first and second head interior cavities.

6. The third rail insulator set forth in claim 1, further characterized in that said body extends from said head interior base.

7. The third rail insulator set forth in claim 1, further characterized in that said internal cylindrical structure comprises a cylindrical structure perimeter edge having a fourth predetermined diameter.

8. The third rail insulator set forth in claim 7, further characterized in that said bottom perimeter edge and said cylindrical structure perimeter edge aligns on a same plane.

9. The third rail insulator set forth in claim 1, further characterized in that said radial walls extend from said lateral interior face to said body.

10. The third rail insulator set forth in claim 1, further characterized in that a first set of base radial walls extends from an interior face of said body to said internal cylindrical structure defining pedestal cavities, and a second set of said base radial walls extend from an interior face of said internal cylindrical structure to said central cylindrical structure.

11. The third rail insulator set forth in claim 7, further characterized in that said first predetermined diameter is larger than said third predetermined diameter, and said fourth diameter is smaller than said third predetermined diameter.

12. The third rail insulator set forth in claim 1, further characterized in that said second predetermined diameter is smaller than said third predetermined diameter.

13. The third rail insulator set forth in claim 1, further characterized in said channel receives said contact rail assembly.

* * * * *